Figure 1:
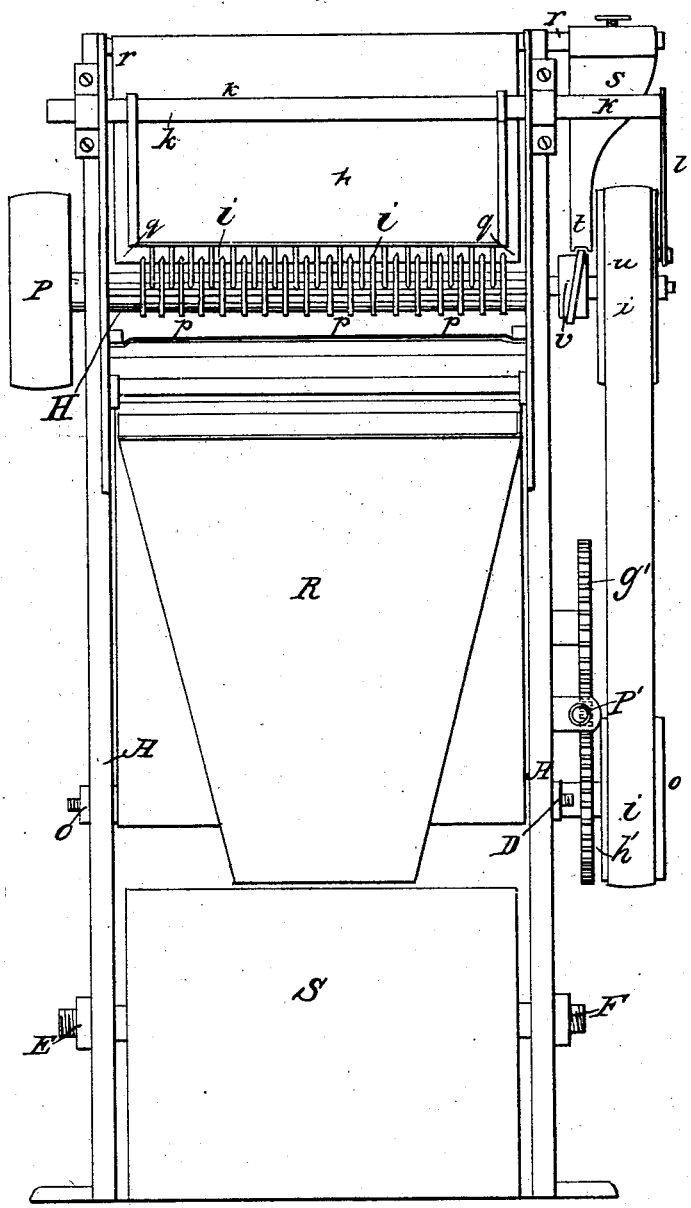

W. P. BAKER.
Cotton Gin.

No. 1,013.

2 Sheets—Sheet 1.

Patented Nov. 20, 1838.

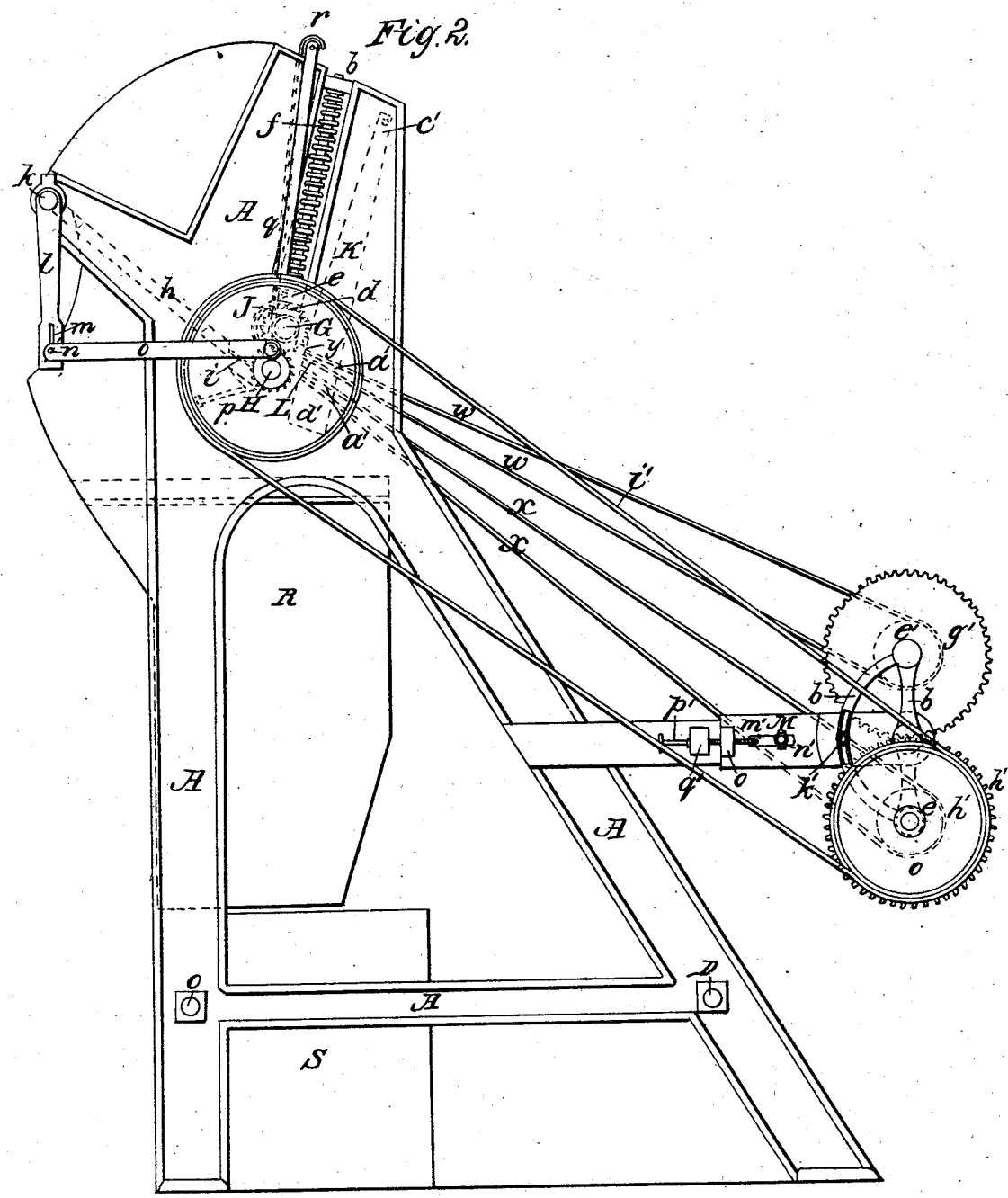

UNITED STATES PATENT OFFICE.

WM. P. BAKER, OF BOSTON, MASSACHUSETTS.

IMPROVEMENT IN COTTON-GINS FOR SEPARATING SEEDS AND OTHER FOREIGN MATTER FROM COTTON.

Specification forming part of Letters Patent No. 1,013, dated November 20, 1838.

*To all whom it may concern:*

Be it known that I, WILLIAM P. BAKER, of Boston, in the county of Suffolk and State of Massachusetts, have invented new and useful Improvements in Machinery for Ginning Cotton or Separating the Seeds and other Foreign Matters therefrom.

These improvements, the principles thereof, and manner in which I have contemplated the application of the same by which it may be distinguished from other inventions, together with such parts, improvements, or combinations I claim as my invention and hold to be original and new, I have herein set forth and described, which description, taken in connection with the accompanying drawings herein referred to, compose my specification.

Figures 1 and 2 represent my improved machinery. Fig. 1 is a front elevation, and Fig. 2 an end elevation, of the same.

A A A A, Figs. 1 and 2, is the frame-work, constructed in any suitable manner and of any proper material, and secured together by iron girts with nuts and screws on each extremity, as shown at C D E F.

G H, Fig. 2, are two fluted cylinders or rollers, of cast-steel or other suitable metal or material, the teeth or ridges on one operating in the corresponding flutes of the other, so that both are turned by the revolutions of either. The upper roller may be composed of cork, wood, or leather, in which the flutes are made. The journals of the lower cylinder, H, rest and turn in suitable bearings in the bottom of the oblique slot I, cut in the frame-work, and dotted in the drawings toward the lower end of the same. The upper roller rests and turns in suitable boxes, $a$, attached to the lower part of the rod $b\ c$. This part of the rod has a screw, $d$, cut on its surface, on which a nut, $e$, works. Against the upper surface of this nut a spiral spring, $f$, presses, which is wound around the rod $b\ c$, the upper end of the spring pressing against the stationary nut $g$, firmly fixed in the slot I, through which nut the rod $b\ c$ plays loosely. By turning the nut $e$ up or down on the screw $d$ it will serve to increase or diminish the distance between the upper and lower rollers, the elasticity of the spring $f$ operating against the nut $e$ and moving the rod $b\ c$, together with the box or bearing $a$, as desired.

Immediately in front of the rollers G H there is a guard, J, the lower end of which is curved, as seen in the drawings, so as to prevent the seeds from passing into the flutes of the rollers. The position of this guard may be varied in any way to answer the required purpose. The cotton passes to the rollers on an inclined plane or feeder, $h$, with teeth $i\ i$ on the lower end, as shown by dotted lines in Fig. 2. The upper end of the feeder is attached to a shaft, $k\ k$, which rests and turns in suitable bearings in the frame-work. On one end of this shaft is fixed firmly, so as not to turn thereon, the arm $l$, which has in its lower end the slot $m$, to which, by a clamp and adjusting-screw, $n$, is attached one end of the connecting rod or arm $o$, the other end being fixed to an eccentric point or projection of the roller H, so that the revolutions of the roller will impart a vibrating motion to the feeder $h$ by means of the above-described apparatus. Near the toothed end of the feeder there is another stationary system of teeth, $p\ p$, which project in a direction parallel but opposite to those of the feeder, so that the latter may operate in the intervening spaces between the former, and by picking the cotton a little have a tendency to loosen the seeds therein.

In combination with the above I sometimes use a comb, $q$, resting on a shaft, $r\ r$, to which is imparted a reciprocating rectilinear motion by means of the arm $s$, projecting at right angles from the same, the lower extremity of which has a groove or slot, $t$, operating on the spiral ridge $u$ on the surface of the pulley $v$, which is fixed on and revolves with the axis of the lower roller, H. The teeth of this comb, being moved from side to side over the cotton, serve to open it a little and loosen the seeds, as before observed. This operation of loosening the seeds as well as that of the rollers on the cotton have no tendency to injure the staple. After passing through or between the rollers, the cotton is drawn out and received by the bands or aprons $w\ x$, by the motions of which it is borne along from said rollers. These bands or aprons pass over wires on cylinders $y\ z$, which rest and turn in grooves in the cross-bars $a'\ b'$, placed in proper slots in the frame K, which is attached by screws or pins $c'\ d'$ to the frame A A, so that if the cotton clogs between the rollers and aprons by loosening the screw $d'$ the frame K and all the apparatus connected thereto will swing down from the rollers and allow a remedy. The other ends of the aprons pass over the drums or rollers $e'$ $f'$, revolving in bearings in the semicircular heads, which are attached to sliding frames N on the projection from the framework M by means of an axis passing through the end of the frame and the center of the semicircular heads.

On the axes of the rollers $e'$ $f'$ are affixed the spur-gear wheels $g'$ $h'$, which, operating together, cause the rollers $e'$ $f'$ to turn in opposite directions, and the bands to move so as to draw the cotton away, the roller $f'$ being turned by a pulley, O, on its axis, and connected by a band, $i'$ $i'$, with a pulley on the axis of the roller H, this being revolved by power applied to a pulley, P, on the other end of its axis. Should the bands at any time become loose or disordered, they may be regulated by the sliding frames and semicircular heads, as follows:

In the circular part of the head L there is a slot, $k'$, in which a clamp-screw, $l'$, works, so that by loosening the screw $l'$ the head L turns freely through any space that the slot will permit, and by tightening the same the head is firmly secured to the sliding frame. In the sliding frame there is likewise a slot, $m'$, through which the screw of the clamp $n'$ passes into the projecting frame-work M. In the end of the sliding frame there is a nut, $o'$, in which one end of a screw, $p'$, works, the other end pressing against the stationary block $q'$, attached to the frame M, so that by loosening the clamp-screws $l'$ $n'$ and turning the screw $p'$ the sliding frame may be moved along until the parts come into their right position, or the machinery is regulated, when the clamps serve to confine them. After the seeds are separated from the cotton, they drop into a sieve in the conductor R, through which they pass into the box S, from which they may be removed at pleasure.

Two of these machines may be connected together by extending the axis of one of the rollers through the two, the combs being operated by one spiral ridged pulley on the same.

Instead of turning the rollers $e'$ $f'$ by the geared wheels, pulleys may be substituted on their axes, and a cross-band over the same will produce the required effects.

Having thus described my improved machinery, I shall now proceed to specifically point out those parts I intend to claim as my invention and consider as original and new. They are as follows:

1. The vibrating feeder $h$, with teeth on the same, and the system of teeth $p$ $p$, constructed and operating with each other in the manner above described, and for the purpose above set forth; also, the moving comb operated, as above described, by means of the arm and spiral ridged pulley.

2. The mode of adjusting the bands by means of the sliding frames with the screws and clamps in the same, in combination with the semicircular heads, operating as above described.

In testimony that the above is a true description of my invention and improvements I have hereto set my hand this 5th day of December, in the year 1837.

WILLIAM P. BAKER. [L. S.]

Witnesses:
EZRA LINCOLN, Jr.,
FRANKLIN BARRACOTT.